United States Patent
Wang et al.

(10) Patent No.: US 8,170,332 B2
(45) Date of Patent: May 1, 2012

(54) AUTOMATIC RED-EYE OBJECT CLASSIFICATION IN DIGITAL IMAGES USING A BOOSTING-BASED FRAMEWORK

(75) Inventors: Jie Wang, Toronto (CA); Rastislav Lukac, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 356 days.

(21) Appl. No.: 12/575,298

(22) Filed: Oct. 7, 2009

(65) Prior Publication Data
US 2011/0081079 A1    Apr. 7, 2011

(51) Int. Cl.
G06K 9/00    (2006.01)
H04N 5/00    (2011.01)
(52) U.S. Cl. ......... 382/162; 382/171; 382/181; 348/607
(58) Field of Classification Search .......... 382/100–320; 348/500–844
See application file for complete search history.

(56) References Cited

U.S. PATENT DOCUMENTS

| | | | |
|---|---|---|---|
| 5,990,973 A | 11/1999 | Sakamoto | |
| 6,574,354 B2 * | 6/2003 | Abdel-Mottaleb et al. | 382/118 |
| 6,829,384 B2 * | 12/2004 | Schneiderman et al. | 382/154 |
| 7,116,820 B2 | 10/2006 | Luo et al. | |
| 7,194,114 B2 * | 3/2007 | Schneiderman | 382/118 |
| 7,224,850 B2 * | 5/2007 | Zhang et al. | 382/275 |
| 7,254,270 B2 | 8/2007 | Simske | |
| 7,333,653 B2 * | 2/2008 | Luo et al. | 382/165 |
| 7,343,028 B2 * | 3/2008 | Ioffe et al. | 382/118 |
| 7,379,568 B2 | 5/2008 | Movellan et al. | |
| 7,433,495 B2 | 10/2008 | Rui et al. | |
| 7,596,247 B2 * | 9/2009 | Ioffe | 382/118 |
| 7,643,674 B2 * | 1/2010 | Luo | 382/159 |
| 2003/0044177 A1 | 3/2003 | Oberhardt et al. | |
| 2004/0066966 A1 | 4/2004 | Schneiderman | |

(Continued)

FOREIGN PATENT DOCUMENTS

EP    1918850 A2    5/2008

(Continued)

OTHER PUBLICATIONS

A Brief Introduction to Boosting, Robert E. Shapire, AT & T Labs, Shannon Laboratory, 180 Park Avenue, Room A279, Florham Park, NJ 07932, Proceedings of the Sixteenth International Joint Conference on Artificial Intelligence, Jan. 1999, (pp. 1-6).

(Continued)

*Primary Examiner* — Manav Seth
(74) *Attorney, Agent, or Firm* — Mark P. Watson (57) ABSTRACT

Automatic red-eye object classification in digital images using a boosting-based framework. In a first example embodiment, a method for classifying a candidate red-eye object in a digital photographic image includes several acts. First, a candidate red-eye object in a digital photographic image is selected. Next, a search scale set and a search region for the candidate red-eye object where an eye object may reside is determined. Then, the number of subwindows that satisfy an AdaBoost classifier is determined. This number is denoted as a vote. Next, the maximum size of the subwindows that satisfy the AdaBoost classifier is determined. Then, a normalized threshold is calculated by multiplying a predetermined constant threshold by the calculated maximum size. Next, the vote is compared with the normalized threshold. Finally, the candidate red-eye object is transformed into a true red-eye object if the vote is greater than the normalized threshold.

7 Claims, 9 Drawing Sheets

U.S. PATENT DOCUMENTS

| | | | |
|---|---|---|---|
| 2004/0228542 A1 | 11/2004 | Zhang et al. | |
| 2004/0233299 A1 | 11/2004 | Ioffe et al. | |
| 2005/0047655 A1 | 3/2005 | Luo et al. | |
| 2005/0219385 A1 | 10/2005 | Terakawa | |
| 2005/0220346 A1 | 10/2005 | Akahori | |
| 2005/0220347 A1 | 10/2005 | Enomoto et al. | |
| 2005/0226499 A1 | 10/2005 | Terakawa | |
| 2006/0035259 A1 | 2/2006 | Yokouchi et al. | |
| 2006/0088207 A1 | 4/2006 | Schneiderman | |
| 2006/0126938 A1 | 6/2006 | Lee et al. | |
| 2006/0126940 A1 | 6/2006 | Kim et al. | |
| 2006/0204052 A1 | 9/2006 | Yokouchi | |
| 2006/0257017 A1 | 11/2006 | Luo | |
| 2006/0257132 A1 | 11/2006 | Shiffer et al. | |
| 2007/0036438 A1 | 2/2007 | Thakur | |
| 2007/0154096 A1 | 7/2007 | Cao et al. | |
| 2007/0201742 A1 | 8/2007 | Hayashi | |
| 2007/0263928 A1 | 11/2007 | Akahori | |
| 2008/0170778 A1 | 7/2008 | Luo | |
| 2008/0205750 A1 | 8/2008 | Porikli et al. | |
| 2008/0218603 A1 | 9/2008 | Oishi | |
| 2008/0219517 A1 | 9/2008 | Blonk et al. | |
| 2008/0260239 A1 | 10/2008 | Han et al. | |
| 2008/0285862 A1 | 11/2008 | Tu et al. | |
| 2011/0001850 A1* | 1/2011 | Gaubatz et al. | 348/241 |

FOREIGN PATENT DOCUMENTS

| | | |
|---|---|---|
| EP | 1596323 B1 | 11/2008 |
| WO | 2007116947 A1 | 10/2007 |
| WO | 2008104453 A1 | 9/2008 |
| WO | 2008119368 A1 | 10/2008 |

OTHER PUBLICATIONS

A Detector Tree of Boosted Classifiers for Real-Time Object Detection and Tracking, Rainer Lienhart, Luhong Liang, and Alexander Kuranov, Microcomputer Research Labs, Intel Corporation, Santa Clara, CA 95052, Jan. 2003, (pp. 1-4).

An Efficient Automatic Redeye Detection and Correction Algorithm, Huitao Luo, Jonathan Yen and Dan Tretter, Hewlett-Packard Labs, 1501 Page Mill Road, MS 1203, Palo Alto, CA 94304, Jan. 2004, (pp. 1-4).

Automatic Red Eye Correction and its Quality Metric, Ilia V. Safonov, Michael N. Rychagov, Kimin Kang, Sang Ho Kim, Samsung Research Center, 29 1-st Brestskaya str., Moscow, Rusia 125047, Digital Printing Division, Samsung Electronics Co., Ltd., 416 Maetan-3Dong, Yeongtong-Gu, Suwon, Korea 443-742, Jan. 2008, (pp. 1-10).

Automatic Red Eye Detection, Ilia V. Safonov, Samsung Research Center, Moscow, Russia, Jun. 23-27, 2007, (pp. 1-8).

Experiments with a New Boosting Algorithm, Yoav Freund and Robert E. Schapire, AT & T Laboratories, 600 Mountain Avenue, Murray Hill, NJ 07974-0636, Machine Learning: Proceedings of the Thirteenth International Conference, Jan. 1996, (pp. 1-9).

Face Recognition Using Ada-Boosted Gabor Features, Peng Yang, Shiguang Shan, Wen Gao, Stan Z. Li, Dong Zhang, Institute of Computing Technology of Chinese Academy Science, Microsoft Research Asia, May 17-19, 2004, (pp. 1-6).

Floatboost Learning and Statistical Face Detection, Stan Z. Li, Senior Member, IEEE, and Zhenqiu Zhang, IEEE Transactions on Pattern Analysis and Machine Intelligence, vol. 26, No. 9, Sep. 2004, (pp. 1-12).

Improved Boosting Algorithms Using Confidence-Rated Predictions, Robert E. Schapire and Yoram Singer, AT & T Labs, Shannon Laboratory, 180 Park Avenue, Room A279 and A277, Florham Park, NJ 07932-0971, Machine Learning, Jan. 1999, (pp. 297-336).

Pre-Eliminating Features for Fast Training in Real Time Object Detection in Images with a Novel Variant of Adaboost, Milos Stojmenovic, Site, University of Ottawa, Ottawa, Ontario, Canada K1N 6N5, IEEE, Jan. 2006, (pp. 329-334).

Rapid Object Detection Using a Boosted Cascade of Simple Features, Viola P., and Jones, M., Mitsubishi Electric Research Laboratories, May 2004, (pp. 1-9).

Red Eye Detection with Machine Learning, Gergey Loffe, Fujifilm Software (California), 1740 Technology Drive, Suite 490, San Jose, CA 95110, Sep. 14-17, 2003, (pp. 1-4).

Boosting the Margin: A New Explanation for the Effectiveness of Voting Methods, Robert E. Schapire and Yoav Freund, AT & T Labs, 180 Park Avenue, Rooms A279 and A205, Peter Bartlett, Dept. of Systems Engineering, RSISE, Aust. National University, Canberra, ACT 0200 Australia, and Wee Sun Lee, School of Electrical Engineering, University of College UNSW, Australian Defence Force Academy, Canberra, ACT 2600, Australia, May 7, 1998, (pp. 1-30).

A Decision-Theoretic Generalization of On-Line Learning and an Application to Boosting, Yoav Freund and Robert E. Schapire, AT & T Labs, 180 Park Avenue, Florham Park, New Jersey, 07932, Dec. 19, 1996, (pp. 119-139).

Fast and Robust Classification using Asymmetric AdaBoost and a Detector Cascade, Paul Viola and Michael Jones, Mitsubishi Electric Research Lab, Cambridge, MA, Proc. of Neural Information Processing Systems, Jan. 2001, (pp. 1-8).

* cited by examiner

AUTOMATIC RED-EYE OBJECT CLASSIFICATION IN DIGITAL IMAGES USING A BOOSTING-BASED FRAMEWORK

THE FIELD OF THE INVENTION

Embodiments of present invention relate to digital image processing and pattern recognition. More specifically, example embodiments of the present invention relate to methods for automatic red-eye object classification in digital images using a boosting-based framework.

BACKGROUND

Red-eye detection and correction technologies are used in printers, digital cameras, photo viewers, and image editing software to localize and correct the red-eye effects in digital photographs captured using a flash. Though there has been a great deal of progress in red-eye detection and correction in the last few years, many problems remain unsolved. For example, red-eye detection and correction must deal with varying illumination, low image quality and resolution, eye size and face orientation variations, and background changes in complex real-life scenes.

Typically, early stages of a red-eye detection pipeline have to distinguish between true red-eye objects and a number of incorrectly detected non-red-eye objects, also known as false red-eye objects. False red-eye objects are particularly prevalent in complex visual scenes. False red-eye objects can be reduced based on the evaluation of the objects' color, structural and geometric characteristics. Unfortunately, many real-world patterns exhibit similar color and structural characteristics as true red-eye objects, thus resulting in a high number of false red-eye objects even at higher stages of the detection pipeline.

SUMMARY

In general, example embodiments relate to methods for automatic red-eye object classification in digital images using a boosting-based framework. Some example embodiments employ sophisticated features and classifiers at the late stages of a detection pipeline while preserving high-computational speed and improving the performance of the detection pipeline.

In a first example embodiment, a method for classifying a candidate red-eye object in a digital photographic image includes several acts. First, a candidate red-eye object in a digital photographic image is selected. Next, a search scale set and a search region for the candidate red-eye object where an eye object may reside is determined. Then, the number of subwindows that satisfy an AdaBoost classifier is determined. This number is denoted as a vote. Next, the maximum size of the subwindows that satisfy the AdaBoost classifier is determined. Then, a normalized threshold is calculated by multiplying a predetermined constant threshold by the calculated maximum size. Next, the vote is compared with the normalized threshold. Finally, the candidate red-eye object is transformed into a true red-eye object if the vote is greater than the normalized threshold.

In a second example embodiment, another method for classifying a candidate red-eye object in a digital photographic image includes several acts. First, a candidate red-eye object in a digital photographic image is selected. Next, for the selected candidate red-eye object, the number of subwindows passed through an AdaBoost classifier for a certain classification stage is determined. Then, a ratio is calculated between either: the number of subwindows passed through a current stage and the number of subwindows passed through a previous stage, or the number of subwindows passed through the current stage and the difference between the total number of subwindows to be tested by the AdaBoost classifier and the number of subwindows passed through the previous stage. Next, the ratio is compared with a stage threshold. Finally, the candidate red-eye object is transformed into a true red-eye object if this ratio is determined to be greater than or equal to the stage threshold.

In a third example embodiment, yet another method for classifying a candidate red-eye object in a digital photographic image includes several acts. First, a candidate red-eye object in a digital photographic image is selected. Next, a binary map is created that distinguishes between center pixels of subwindows of a candidate red-eye object passed through an AdaBoost classifier and all other pixels of the digital photographic image. Then, an area of the bounding box of the center pixels is determined. Next, the binary map is labeled and connected pixels to multiple objects are grouped. Then, the number of objects in the binary map is determined. Next, the maximal area of the objects in the binary map is determined. Then, the ratio of the maximal area to the area of the bounding box is calculated. Next, the ratio is compared to a threshold. Finally, the candidate red-eye object is transformed into a true red-eye object if this ratio is determined to be greater than or equal to the threshold.

In fourth, fifth, and sixth example embodiments, one or more computer-readable media have computer-readable instructions thereon which, when executed by a processor, implement the methods discussed above in connection with the first, second, and third example embodiments, respectively.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features will be set forth in the description which follows, and in part will be obvious from the description, or may be learned by the practice of the teachings herein. Features of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To further develop the above and other aspects of example embodiments of the invention, a more particular description of these examples will be rendered by reference to specific embodiments thereof which are disclosed in the appended drawings. It is appreciated that these drawings depict only example embodiments of the invention and are therefore not to be considered limiting of its scope. It is also appreciated that the drawings are diagrammatic and schematic representations of example embodiments of the invention, and are not limiting of the present invention. Example embodiments of the invention will be disclosed and explained with additional specificity and detail through the use of the accompanying drawings in which.

DETAILED DESCRIPTION OF SOME EXAMPLE EMBODIMENTS

In the following detailed description of the embodiments, reference is made to the accompanying drawings that show, by way of illustration, specific embodiments of the invention. In the drawings, like numerals describe substantially similar components throughout the several views. These embodiments are described in sufficient detail to enable those skilled in the art to practice the invention. Other embodiments may be utilized and structural, logical and electrical changes may be made without departing from the scope of the present invention. Moreover, it is to be understood that the various embodiments of the invention, although different, are not necessarily mutually exclusive. For example, a particular feature, structure, or characteristic described in one embodiment may be included within other embodiments. The following detailed description is, therefore, not to be taken in a limiting sense, and the scope of the present invention is defined only by the appended claims, along with the full scope of equivalents to which such claims are entitled.

In general, example embodiments relate to systems and methods for automatic red-eye object classification in digital images using a boosting-based framework. Example embodiments can be used to automatically identify and remove false red-eye objects from a list of candidate red-eye objects. Some example embodiments further refine true red-eye objects for further processing.

I. Example Environment

The example methods and variations thereof disclosed herein can be implemented using computer-readable media for carrying or having computer-executable instructions or data structures stored thereon. Such computer-readable media can be any available media that can be accessed by a processor of a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store program code in the form of computer-executable instructions or data structures and which can be accessed by a processor of a general purpose or special purpose computer. Combinations of the above should also be included within the scope of computer-readable media.

Computer-executable instructions comprise, for example, instructions and data which cause a processor of a general purpose computer or a special purpose computer to perform a certain function or group of functions. Although the subject matter is described herein in language specific to methodological acts, it is to be understood that the subject matter defined in the appended claims is not necessarily limited to the specific acts described herein. Rather, the specific acts described herein are disclosed as example forms of implementing the claims.

Examples of special purpose computers include image processing apparatuses such as digital cameras (an example of which includes, but is not limited to, the Epson R-D1 digital camera manufactured by Seiko Epson Corporation headquartered in Owa, Suwa, Nagano, Japan), digital document cameras (an example of which includes, but is not limited to, the Epson DC-10s document camera manufactured by Seiko Epson Corporation), digital camcorders, projectors, printers (examples of which include, but are not limited to, the Epson Artisan® 50 Ink Jet Printer, Epson WorkForce 30 and 40 Ink Jet Printers, the Epson Stylus C88+, Photo R280, Photo 1400, Photo R1900, and Photo R2880 Ink Jet Printers, and Epson B-300 and B-500DN Color Business Ink Jet Printers, all manufactured by Seiko Epson Corporation), scanners (examples of which include, but are not limited to, the Epson Perfection© V30, V200, V300, V500, V700, 4490, V750-M Pro, and 4490, the Epson Expression© 10000XL, and the Epson GT-580, GT-1500, GT-2500, GT-15000, GT-20000, and GT-30000, all manufactured by Seiko Epson Corporation), copiers, portable photo viewers (examples of which include, but are not limited to, the Epson P-3000, P-5000, P-6000, and P-7000 portable photo viewers manufactured by Seiko Epson Corporation), or portable movie players, or some combination thereof, such as printer/scanner/copier combinations or "All-in-Ones" (examples of which include, but are not limited to, the Epson Stylus Photo RX580, RX595, or RX680, the Epson Stylus CX4400, CX7400, CX8400, or CX9400Fax, the Epson AcuLaser® CX11NF, and the Epson Artisan® 500, 600, 700, and 800, all manufactured by Seiko Epson Corporation) or a digital camera/camcorder combinations.

An image processing apparatus may include automatic red-eye detection and correction capability, which includes automatic red-eye object classification capabilities, for example, to automatically detect and correct red-eye objects in a digital photograph. For example, a printer with this automatic red-eye detection and correction capability may include one or more computer-readable media that implement the example methods disclosed herein, or a computer connected to the printer may include one or more computer-readable media that implement the example methods disclosed herein.

Figure 1:
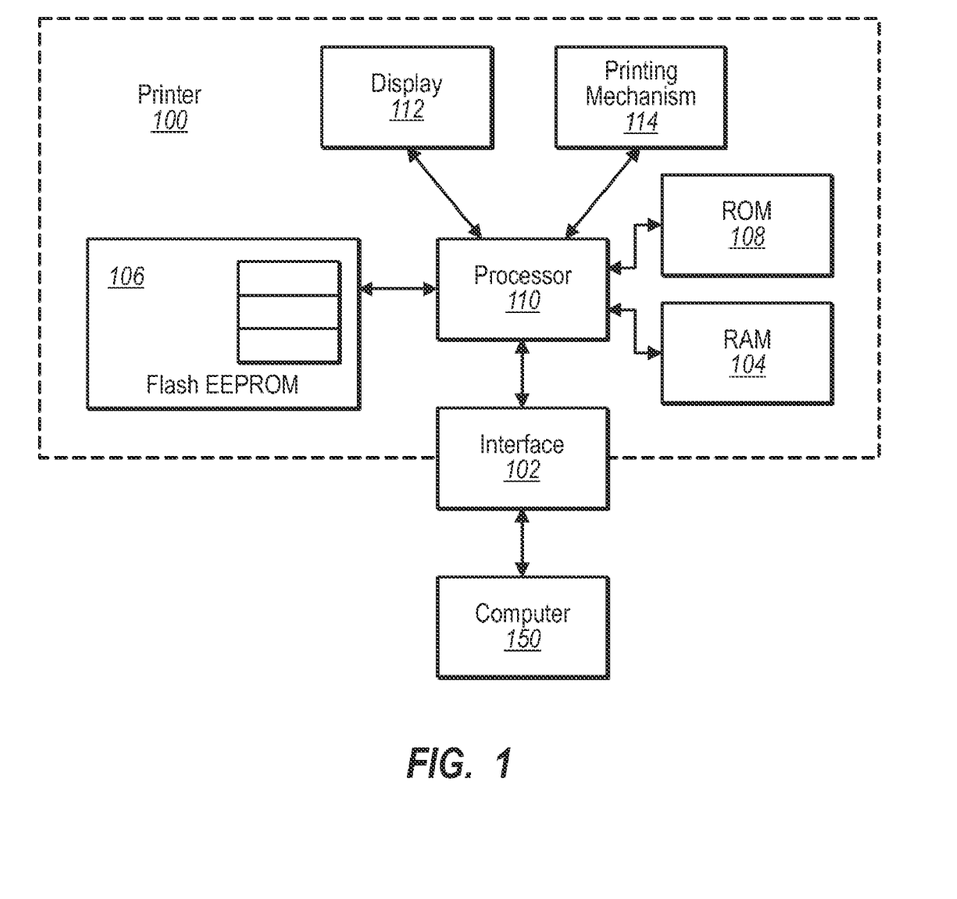
FIG. 1 is a schematic representation of an example printer.

While any imaging apparatus could be used, for purposes of illustration an example embodiment will be described in connection with an example printer, a schematic representation of which is denoted at 100 in FIG. 1. Example embodiments of the printer 100 include, but are not limited to, the printer models or printer/scanner/copier "All-in-One" models disclosed herein.

The example printer 100 exchanges data with a host computer 150 by way of an intervening interface 102. Application programs and a printer driver may also be stored for access on the host computer 150 or on the printer 100. When an image retrieve command is received from the application program, for example, the printer driver controls conversion of the command data to a format suitable for the printer 100 and sends the converted command data to the printer 100. The driver also receives and interprets various signals and data from the printer 100, and provides necessary information to the user by way of the host computer 150.

When data is sent by the host computer 150, the interface 102 receives the data and stores it in a receive buffer forming part of a RAM 104. The RAM 104 can be divided into a number of sections, through addressing for example, and allocated as different buffers, such as a receive buffer or a send buffer. For example, digital photographic image data can be sent to the printer 100 from the host computer 150. Digital photographic image data can also be obtained by the printer 100 from the flash EEPROM 106 or the ROM 108. For example, a portable flash EEPROM card can be inserted into the printer 100. This digital photographic image data can then be stored in the receive buffer or the send buffer of the RAM 104.

A processor 110 uses computer-executable instructions stored on the ROM 108 or on the flash EEPROM 106, for example, to perform a certain function or group of functions, such as the example methods for automatic red-eye detection and correction, or for automatic red-eye object classification disclosed herein. Where the data in the receive buffer of the RAM 104 is a digital photographic image, for example, the processor 110 can implement the methodological acts on the digital photographic image of the example methods for automatic red-eye detection and correction disclosed herein to automatically detect and then correct red-eye objects in the digital photographic image. The corrected digital photographic image can then be sent to a display 112 for a preview display thereon, to the printing mechanism(s) 114 for printing thereon, or to the host computer 150 for storage or display thereon, for example. The processor 110 is in electronic communication with the display 112, which can be any type of an electronic display including, but not limited to a visual display such as a liquid crystal display (LCD). The processor 110 is also in electronic communication with the printing mechanism(s) 114, which can be any type of printing mechanism(s) including, but not limited to, ink-jet, laser, LED/LCD, impact, solid ink, and dye sublimation printing mechanism(s).

II. Example Method for Automatic Red-Eye Detection and Correction

Figure 2:
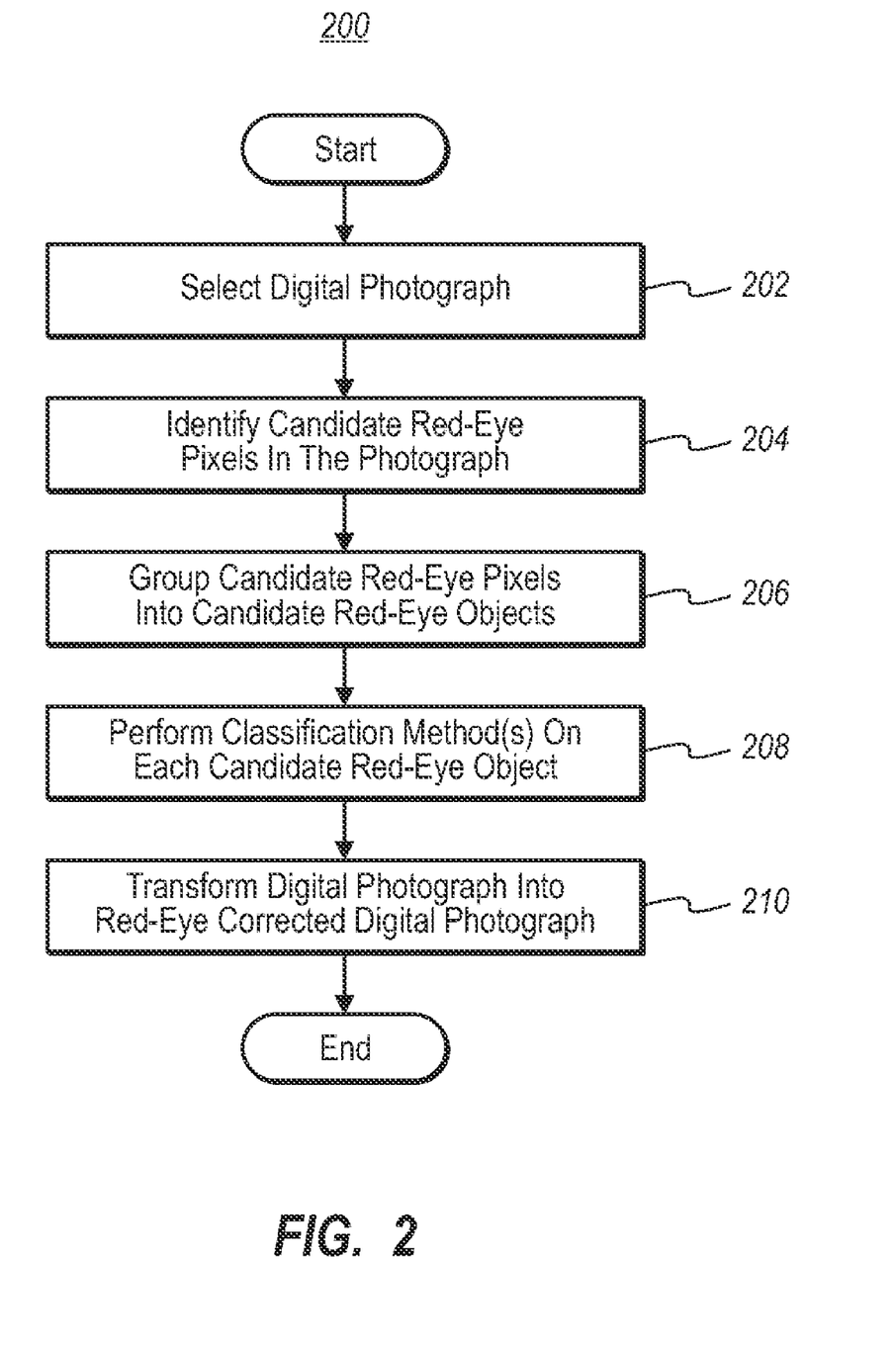
FIG. 2 is a flowchart of an example method for automatic red-eye detection and correction.

FIG. 2 is a flowchart of an example method 200 for automatic red-eye detection and correction. The example method 200 uses a boosting-based framework to detect and correct red-eye objects in a digital photographic image. Accordingly, the example method 200 results in the transformation of a digital photographic image with one or more red-eye objects into a corrected digital photographic image with fewer or no red-eye objects. The various acts of the method 200 will now be discussed in turn.

First, at 202, a digital photograph is selected for red-eye detection and correction. For example, a digital color photograph or a digitized version of a traditional color photograph can be selected for red-eye detection and correction. The digital photograph may constitute a red-green-blue (RGB) color image x with $K_1 \times K_2$ pixels $x_{(r,s)} = [x_{(r,s)1}, x_{(r,s)2}, x_{(r,s)3}]$ where $x_{(r,s)1}$, $x_{(r,s)2}$, and $x_{(r,s)3}$ denote the R, G, and B component, respectively. The term (r, s) denotes the pixel location with $r=1, 2, \ldots, K_1$ and $s=1, 2, \ldots, K_2$ indicating the image row and column, respectively.

Next, at 204, candidate red-eye pixels are identified in the digital photograph. For example, this identification of candidate red-eye pixels can be accomplished by transforming the image x into a binary map d with a resolution of $K_1 \times K_2$ pixels $d_{(r,s)}$ where the value $d_{(r,s)}=1$ indicates that $x_{(r,s)}$ is a candidate red-eye pixel and $d_{(r,s)}=0$ denotes that $x_{(r,s)}$ is not a candidate red-eye pixel. The candidate red-eye pixels can be localized using any known method of red-eye detection.

Then, at 206, candidate red-eye pixels are grouped into candidate red-eye objects. For example, this grouping can be accomplished by performing a procedure whereby the map d undergoes object segmentation which groups adjacent pixels with $d_{(r,s)}=1$. This procedure partitions the map d into N disjoint red-eye candidate objects $O_i = \{(r,s) \in \Phi_i; d_{(r,s)}^i = 1\}$, for $i=1, 2, \ldots, N$. Each red-eye candidate object $O_i$ is characterized by $\Phi_i$, which is the set of pixel locations (r,s) where $d_{(r,s)}^i = 1$ which are bounded by a $\Phi_i^y \times \Phi_i^x$ bounding box with height $\Phi_i^y$ and width $\Phi_i^x$. Thus, the object $O_i$ can be seen as an image of dimensions $\Phi_i^y \times \Phi_i^x$ and can be handled separately from all other objects in $\{O_i; i=1, 2, \ldots, N\}$.

Next, at 208, one or more classification methods or classification/refinement methods is performed on each candidate red-eye object in order to eliminate candidate red-eye objects that are false red-eye objects and confirm the remaining red-eye objects as true red-eye objects, and potentially refine the true red-eye objects. For example, one or more of the classification methods 400, 500, 600, 700, 800, and 900 disclosed herein can be performed on each of the N disjoint red-eye candidate objects $O_i = \{(r,s) \in \Phi_i; d_{(r,s)}^i = 1\}$. The performance of the methods 400, 500, 600, 700, and 800 results in the elimination of false red-eye objects, while the performance of the method 900 results in the addition of true red-eye objects.

Finally, at 210, the original digital photograph is transformed into a red-eye corrected digital photograph by removing the red-eye effect from each confirmed true red-eye object. The red-eye effect can be removed using any known method of red-eye correction.

It is noted that the example method 200 for automatic red-eye detection and correction transforms electronic data that represents a physical and tangible object. In particular, the example method 200 transforms an electronic data representation of a photographic image that represents a real-world visual scene, such as a photograph of a person or a landscape, for example. During the example method 200, the data is transformed from a first state into a second state. In the first state, the data represents the real-world visual scene with red-eye objects present in the scene. In the second state, the data represents the real-world visual scene with the red-eye object removed from the scene.

III. Boosting-Based Techniques

Boosting-based techniques can be efficiently used to design ensemble-based classifiers with high generalization ability. One example of a boosting-based technique is the boosting-based face detection system proposed in Paul Viola & Michael Jones, *Fast and Robust Classification Using Asymmetric Adaboost and a Detector Cascade,* 2001 Proc. of Neural Information Processing Systems, the disclosure of which is incorporated by reference herein in its entirety. The basic idea behind boosting is to generate a set of "weak" classifiers each of which targets different aspects of the problem to be solved. The generated weak classifiers are then combined (boosted) into a "strong" classifier. To generate a set of diverse classifiers, boosting methods train each of the weak classifiers on a weighted version of the training sample set. In each of the training process iterations, the weights are updated through a classification-error-driven mechanism. Boosting demonstrates strong generalization ability and outperforms many other machine learning algorithms in preventing overfitting.

One general boosting-based technique known as AdaBoost (Adaptive Boosting) was proposed in Yoav Freund & Robert E. Schapire, *A Decision-Theoretic Generalization of On-Line Learning and an Application to Boosting,* 55 J. Computer and System Sci. 119-139 (1997), the disclosure of which is incorporated herein by reference in its entirety. The main idea of AdaBoost is to maintain a set of weights over the training set. All weights are initially set equally. In each iteration of the training process, the weights are updated such that the weights of incorrectly classified examples are increased. This makes the current weak classifier focus on the difficult examples. Example pseudocode of the AdaBoost algorithm is as follows:

---

(1) Given $(x_1, y_1), (x_2, y_2), \ldots, (x_m, y_m)$, where $x_i \in X$ and $y_i \in Y = \{-1, +1\}$
(2) Initialize $D_1(i) = 1/m$
(3) For $t = 1$ to $T$
   Train base learner using distribution $D_t$
   Get base classifier $h_t : X \to \Re$ with error $\varepsilon_t = \sum_{i:h_t(x_i) \neq y_i} D_t(i)$
   Choose $\alpha_t \in \Re$, $\alpha_t = \frac{1}{2} \ln \frac{1 - \varepsilon_t}{\varepsilon_t}$
   Update $D_{t+1}(i) = [D_t(i) \exp(-\alpha_t y_i h_t(x_i))] / Z_t$, where $Z_t$ is a normalization factor chosen so that $D_{t+1}$ will be a distribution

---

In face detection, the AdaBoost algorithm is applied to select features for discriminating face and non-face objects. The AdaBoost object detection system is composed of three main modules: i) constructing over-complete Harr-like rectangle features; ii) selecting effective features and constructing weak classifiers based on selected features, and iii) boosting each weak classifier to a strong classifier.

A huge number of Harr-like rectangle features are firstly constructed, each of which may represent part of facial features. The AdaBoost algorithm is then utilized to select a limited number of the most effective features and to construct corresponding weak classifiers. These weak classifiers are then combined to a strong classifier performing a binary classification to determine whether the given example is the object to be detected. To speed up the computation of Harr-like features, a sum-area table technique or an integral image technique may be employed. In addition, to further improve the detection speed and accuracy, a simple-to-complex cascade structure may also be employed. A number of strong classifiers (usually denoted as stages) are constructed in a bootstrapped manner such that only examples that pass through previous strong classifiers are used to train the current strong classifier. In detection, subwindows which fail to pass a strong classifier will not be further processed by the subsequent strong classifiers. This strategy allows for fast rejection of a large number of easy-to-classify background regions and thus focuses on a small number of harder-to-classify samples, which significantly improves detection speed and reduces false positives.

In detection, an input image is scanned to extract subwindows at different locations with different scales. These subwindows are then classified as the object to be detected or not by the trained AdaBoost classifier.

IV. Example Feature Templates

Figure 3:
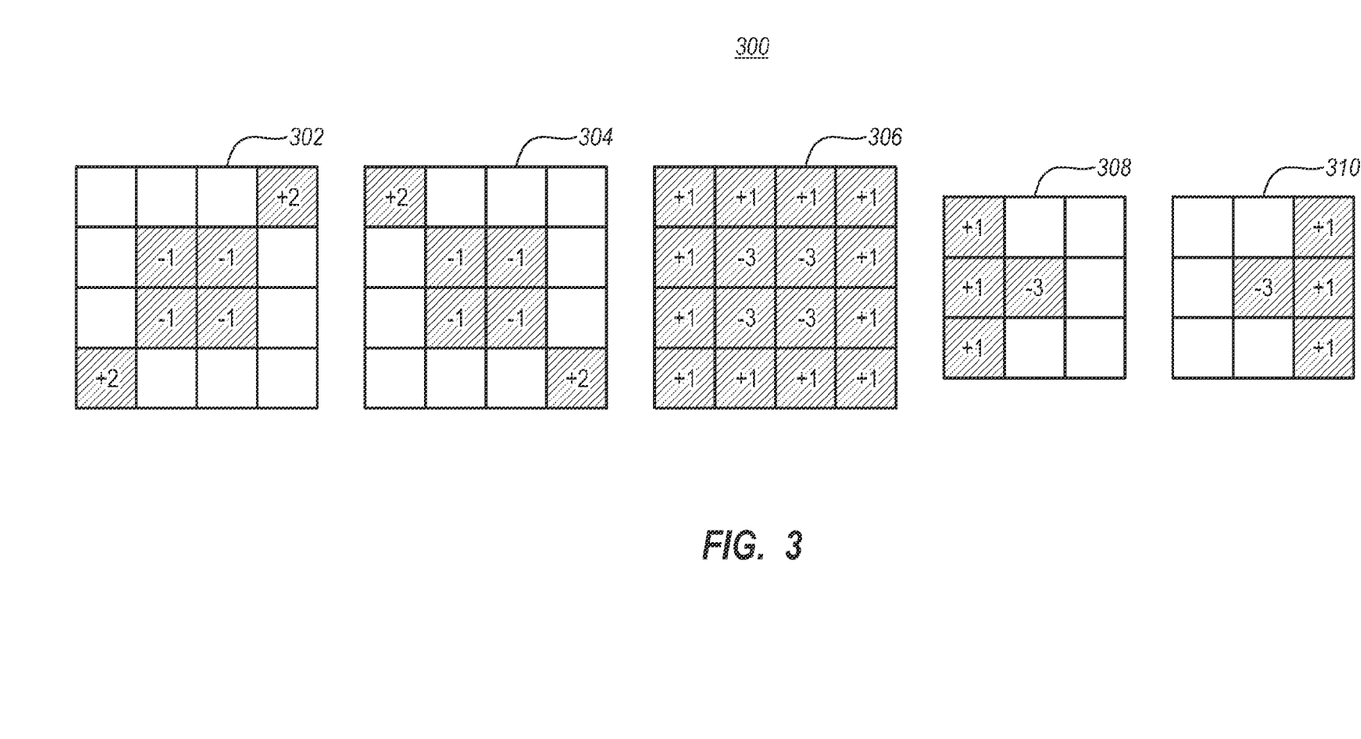
FIG. 3 discloses five Harr-like rectangle feature templates.

An AdaBoost framework is adopted here for classification of candidate objects that have been identified in a red-eye detection pipeline. Since red-eye characteristics differ from common facial characteristics, five Harr-like rectangle feature templates 300 disclosed in FIG. 3 are employed to characterize the eye feature in order to ensure effective red-eye detection using boosting technologies. Each of the feature templates 300 includes various weights, such as '+2', '−1', and '−3' that are multiplied by the corresponding pixel value. The first three templates 302, 304, and 306 are used to capture the contrast of the iris region of a human eye which is usually dark and the sclera region which appears to be white. The last two templates 308 and 310 are trying to capture the characteristics of the left and right eye corner region, that is, the contrast between skin and sclera areas.

In most object detection applications, an AdaBoost classifier is usually trained and applied to grayscale images in order to achieve high processing speed. For red-eye detection, however, grayscale images may not be the best choice, as red-eye objects exhibit significant color characteristics. In addition, eye size is much smaller than face size, suggesting that high processing speeds are achievable even when multidimensional data such as red-green-blue (RGB) color data is used. Therefore, different redness signals can be utilized to achieve better red-eye classification performance. Examples of redness signals include, but are not limited to, R channel, R-G and R-B differences, and 2R-G-B redness signal.

Several example methods for classifying red-eye objects will now be disclosed. It is noted that each of these example methods transforms electronic data that represents a physical and tangible object. In particular, each of these example methods transforms an electronic data representation of a list of candidate red-eye objects in a photographic image that represents a real-world visual scene, such as a photograph of one or more people, for example. During these example methods, the data is transformed from a first state into a second state. In the first state, the data represents a list of candidate red-eye objects in the real-world visual scene. In the second state, the data represents a list of true red-eye objects in the real-world visual scene with false red-eye objects removed from the list.

V. First Example Method for Classifying a Candidate Red-Eye Object

Figure 4:
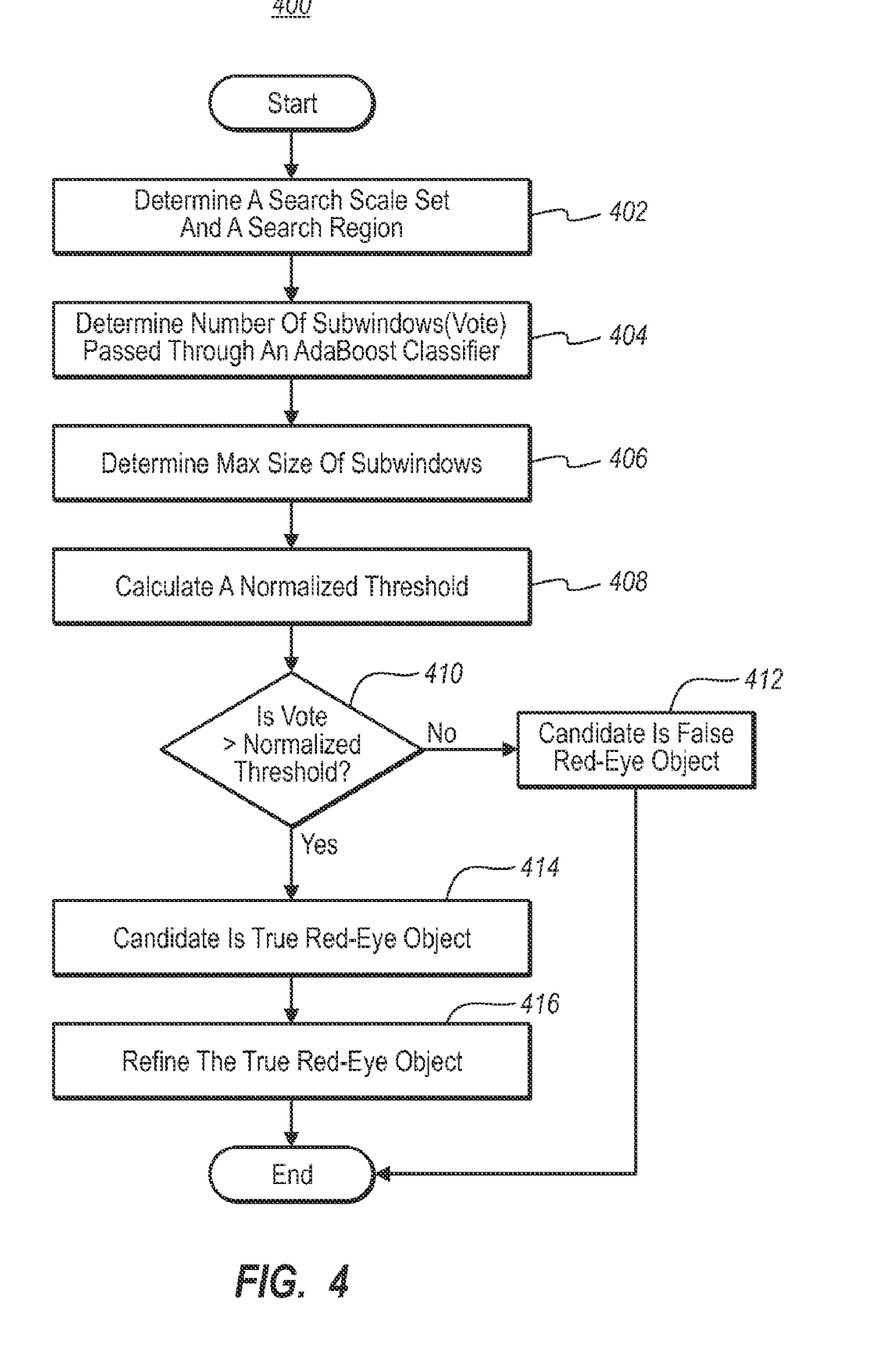
FIG. 4 is a flowchart of a first example red-eye object classification method.

With reference now to FIG. 4, a first example method 400 for classifying and refining a candidate red-eye object in a digital photographic image is disclosed. To improve the classification accuracy of the AdaBoost system, the example method 400 employs a normalized voting scheme. This voting scheme prevents misclassification due to variations in the sizes of candidate objects. The various acts of the method 400 will now be discussed in turn.

First, at 402, a search scale set and a search region for a candidate red-eye object where the eye object may reside are determined. For example, the candidate red-eye object $O_i$ may be selected from a list of N disjoint red-eye candidate objects, as disclosed elsewhere herein. The candidate red-eye object $O_i$: $\{x_i^o, y_i^o, w_i^o, h_i^o\}$ may be represented by both a rectangle bounding box, defined by its center $(x_i^i, y_i^i)$, width $w_i^o$ and height $h_i^o$, and the corresponding area $\Phi_i$ determined from the image d. Since a candidate region produced by previous stages may not be completely accurate in terms of location and size, an AdaBoost classifier is expected to search a larger area than the bounding box area, meaning that the classifier is applied to different locations with different scales. These scales can be defined as $SZ_i = \{sz_1, sz_2, \ldots, sz_M\}$ where M denotes the number of scales to be searched. The corresponding searching area $A_i$: $\{x_i^s, y_i^s, w_i^s, h_i^s\}$ can be seen as a rectangle with a left-top point $(x_i^s, y_i^s)$, a width $w_i^s$, and a height $h_i^s$. Its parameters are defined as $x_i^s = x_i^o - W_i$, $y_i^s = y_i^o - H_i$, $w_i^s = 2 \times W_i$, $h_i^s = 2 \times H_i$, where $W_i$ and $H_i$ define the range of the searching area of candidate $O_i$. The AdaBoost classifier is then exhaustively applied to each subwindow $SW(u, v, s)$ centered at $(\{u, v\} \in A_i)$ with a scale $(s \in SZ_i)$.

Next, at 404, the number of subwindows that satisfy an AdaBoost classifier is determined, with the number of subwindows being denoted as a vote. For example, a trained AdaBoost classifier F is used for candidate object verification and localization purposes. The number of subwindows which satisfy the AdaBoost classifier (i.e., $F(u, v, s) = 1$) is denoted as a vote $V_i$.

Then, at 406, the maximum size of the subwindows that satisfy the AdaBoost classifier is determined. For example, the maximum size $S_i^{max} = \arg\max_{F(u_j, v_j, s_j)=1} s_j$ is the size of the biggest subwindow that satisfies the AdaBoost classifier.

Then, at 408, a normalized threshold is calculated by multiplying a predetermined threshold by the maximum size calculated at act 406. It is understood that $V_i$ is relatively high for a relatively big eye object and relatively small for a relatively small eye object. Thus, a fixed threshold T used for all candidates is not appropriate and may often result in misclassification. To avoid this problem, a normalized threshold $T_i = T_0 \times S_i^{max}$ is employed, where $T_0$ is a predetermined constant threshold. The method 400 can achieve good result when $T_0$ is set to about 1.2 if $\Phi_i > 8$ and set to about 0.8 if $4 < \Phi_i \leq 8$ and set to about 0.4 otherwise.

Next, at 410, the vote is compared to the normalized threshold. For example, the vote $V_i$ can be compared to the normalized threshold $T_i$. If the vote $V_i$ is less than or equal to the normalized threshold $T_i$, then, at 412, the candidate red-eye object $O_i$ is classified as a false red-eye object. Alternatively, if the vote $V_i$ is greater than the normalized threshold $T_i$, then, at 414, the candidate red-eye object $O_i$ is classified as a true red-eye object. In addition, at 416, the true red-eye object $O_i$, the center and size of the true red-eye object $O_i$ is refined to better represent the actual red-eye object. For example, the center and size of the output eye object ($E_i^x$, $E_i^y$, $E_i^s$) can be recomputed by averaging the subwindows which satisfied the AdaBoost classifier.

Example pseudocode for the method 400 is as follows:

```
(1)  Input: Eye candidate region O_i, centered at (x_i^o, y_i^o), width w_i^o,
     height h_i^o;
(2)  Set V_i = 0; x_i^s = x_i^o - W_i, y_i^s = y_i^o - H_i; SZ_i = {sz_1, sz_2, ..., sz_M};
     S_i^max = 0;
     CX_i = [ ], CY_i = [ ], SIZE_i = [ ];
(3)  For s = sz_1 to s = sz_M
         For u = x_i^s to u = x_i^s + 2×W_i
             For v = y_i^s to v = y_i^s + 2×H_i
                 Extract subwindow SW(u,v,s);
                 Apply Adaboost classifier to subwindow F(u,v,s);
                 If SW(u,v,s) pass classifier, i.e., F(u,v,s) = 1
                     V_i = V_i + 1;
                     CX_i[V_i] = u; CY_i[V_i] = v; SIZE_i[V_i] = s;
                     If s > S_i^max
                         S_i^max = s;
(4)  Calculate T_i = T_0 × S_i^max;
(5)  If V_i > T_i
         Set candidate region O_i as Eye;
```

VI. Second Example Method for Classifying a Candidate Red-Eye Object

Figure 5:
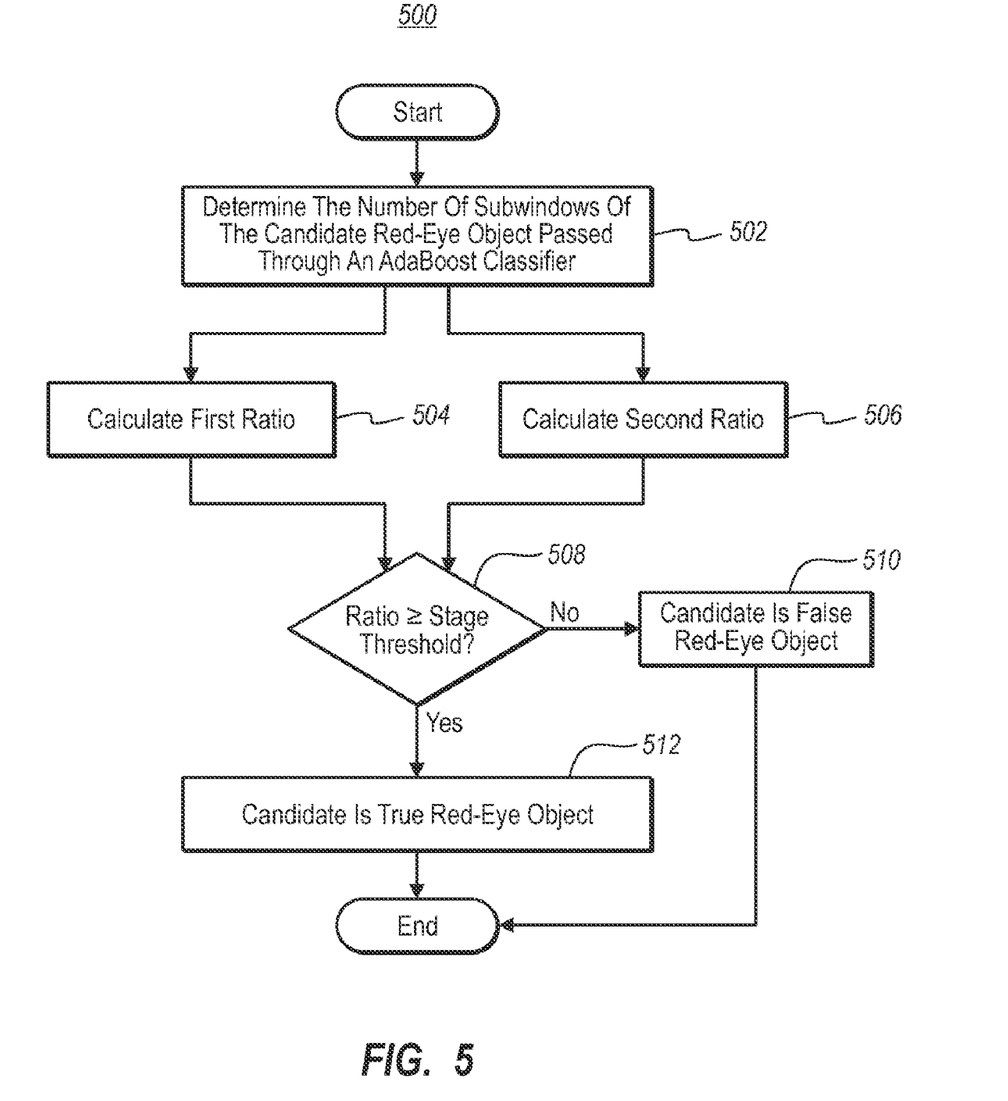
FIG. 5 is a flowchart of a second example red-eye object classification method.

With reference now to FIG. 5, a second example method 500 for classifying a candidate red-eye object in a digital photographic image is disclosed. As described above, several stages are used in AdaBoost to achieve desired detection and classification performances. Since up to sixteen stages can typically be employed and a huge volume of calculations is performed at each of these stages, the elimination of false candidates at early stages of the AdaBoost cascade can help to reduce the computational complexity by reducing both the number of stages in AdaBoost and the number of candidates to be processed by the cascade. In addition, removal of false candidates with simultaneous preservation of desired candidates can improve AdaBoost detection and classification performances. The method 500 enhances both the performance and computational efficiency of AdaBoost by using its stage information. The various acts of the method 500 will now be discussed in turn.

First, at 502, for each candidate red-eye object, the number of subwindows passed through an AdaBoost classifier for a certain classification stage is determined. For example, given a value of λ which denotes the number of stages in the AdaBoost cascade, both $V_i^T$ which is the total number of subwindows to classify and $V_i^\alpha$ which is the number of subwindows that passed the α th stage of AdaBoost are readily available for each candidate $O_i$, for i=1, 2, ... N, undergoing the AdaBoost classification procedure. Thus, this stage information can be used to construct a number of simple classifiers which can be used in both the training and the actual classification phases.

Namely, at 504, a ratio is calculated between the number of subwindows passed through a current stage and the number of subwindows passed through a previous stage or, at 506, a ratio is calculated between the number of subwindows passed through the current stage and the difference between the total number of subwindows to be tested by the AdaBoost classifier and the number of subwindows passed through the previous stage. Then, at 508, the ratio is compared to a stage threshold. If the ratio is less than the stage threshold, then, at 510, the candidate red-eye object is classified as a false red-eye object. Alternatively, if the ratio is greater than or equal to the stage threshold, then, at 512, the candidate red-eye object is classified as a true red-eye object.

For example, based on the observation that outliers are usually characterized by significant changes in $V_i^\alpha$ values, the acts 504, 508, 510, and 512 can be performed as follows:

$$S_i = \begin{cases} 1 & \text{if } V_i^\alpha / V_i^{(\alpha-1)} \geq \eta_\alpha; \alpha = 1, 2, \ldots, \lambda' \\ 0 & \text{otherwise} \end{cases} \quad (1)$$

where $S_i = 1$ denotes that $O_i$ is a true red-eye object whereas $S_i = 0$ denotes that $O_i$ is a false red-eye object. The term $\eta_\alpha$ is a predetermined parameter. Note that $V_i^0 = V_i^T$ and that $\lambda' \leq \lambda$ denotes the number of stages for which this advanced classification is performed. Generally, the classification performance of Equation (1) reduces with the value of α, suggesting this approach may be employed in the lowest stages of the AdaBoost cascade.

Alternatively, the acts 506, 508, 510, and 512 can be performed as follows:

$$S_i = \begin{cases} 1 & \text{if } V_i^1 / V_i^T \geq \eta_1 \\ 1 & \text{if } V_i^\alpha / (V_i^T - V_i^{(\alpha-1)}) \geq \eta_\alpha; \alpha = 2, 3, \ldots, \lambda' \\ 0 & \text{otherwise} \end{cases} \quad (2)$$

Similar to Equation (1), Equation (2) may be employed in the lowest stages of the AdaBoost cascade. It should also be understood the ratio calculations of acts 504 and 506 are not limited to the embodiments presented in Equation (1) and Equation (2). Instead, any other solution based on AdaBoost stage information can be used instead to perform classification in addition to the previous AdaBoost classification procedures.

VII. Third Example Method for Classifying a Candidate Red-Eye Object

Figure 6:
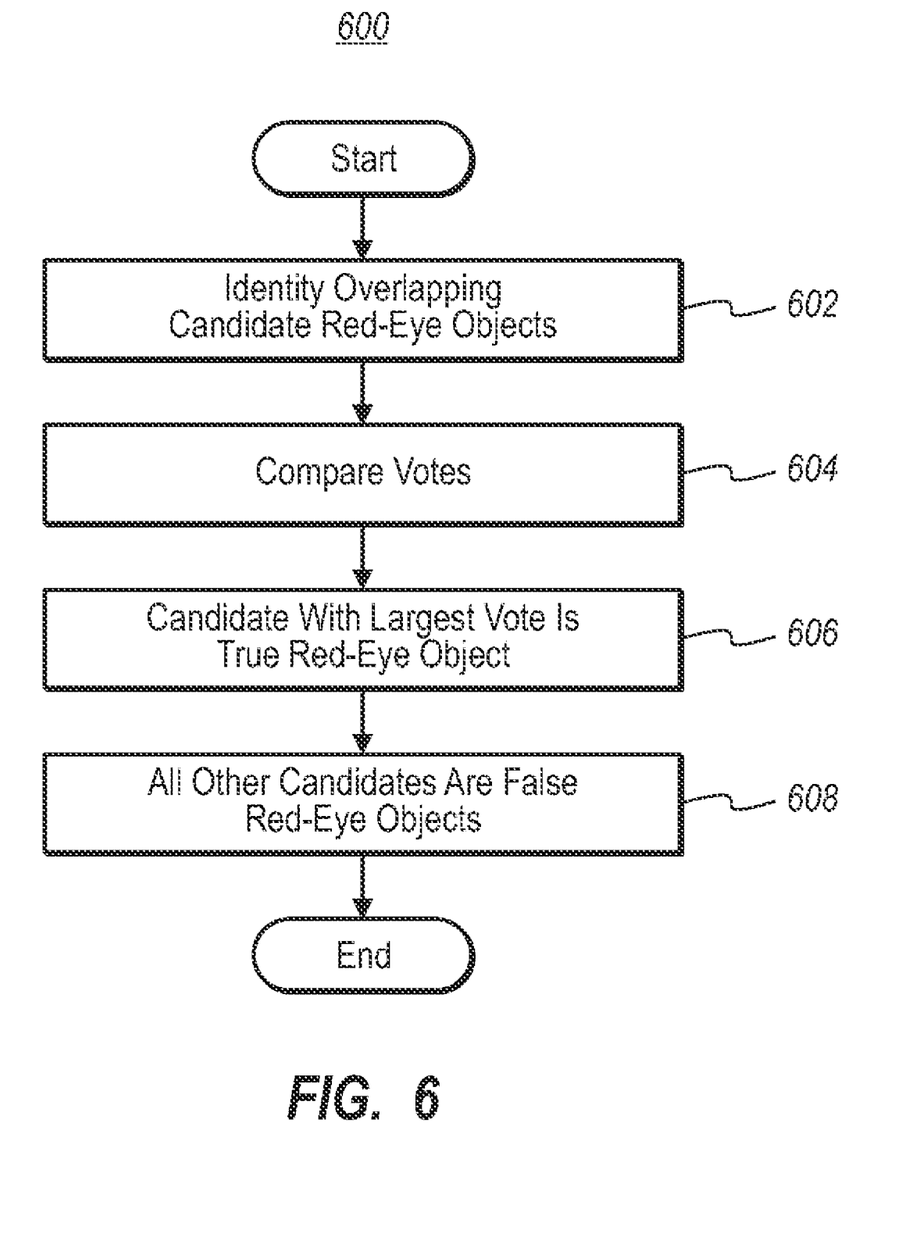
FIG. 6 is a flowchart of a third example red-eye object classification method.

With reference now to FIG. 6, a third example method 600 for classifying a candidate red-eye object in a digital photographic image is disclosed. As it is unusual to have multiple eyes appearing with large overlapping regions in an image, the method 600 reduces false red-eye objects by searching for overlapping objects.

First, at 602, a group of candidate red-eye objects whose bounding boxes are overlapped with each other is identified. Next, at 604, the votes received by each candidate in the group are compared. Then, at 606, the candidate red-eye object with the largest vote is classified as a true red-eye object. This is due in part to the fact that true red-eye objects usually have a much higher classifier's response (i.e., higher $V_i$) than that of the neighboring false red-eye objects. Therefore, given $\gamma$ overlapping detected eye regions ($E_i^x$, $E_i^y$, $E_i^s$), for i=1, 2, ..., $\gamma$, the corresponding votes $V_i$ can be compared and only the region with the highest vote can be kept as a true red-eye object. Finally, at 608, all other candidate red-eye objects in the group are classified as false red-eye objects.

VIII. Fourth Example Method for Classifying a Candidate Red-Eye Object

Figure 7:
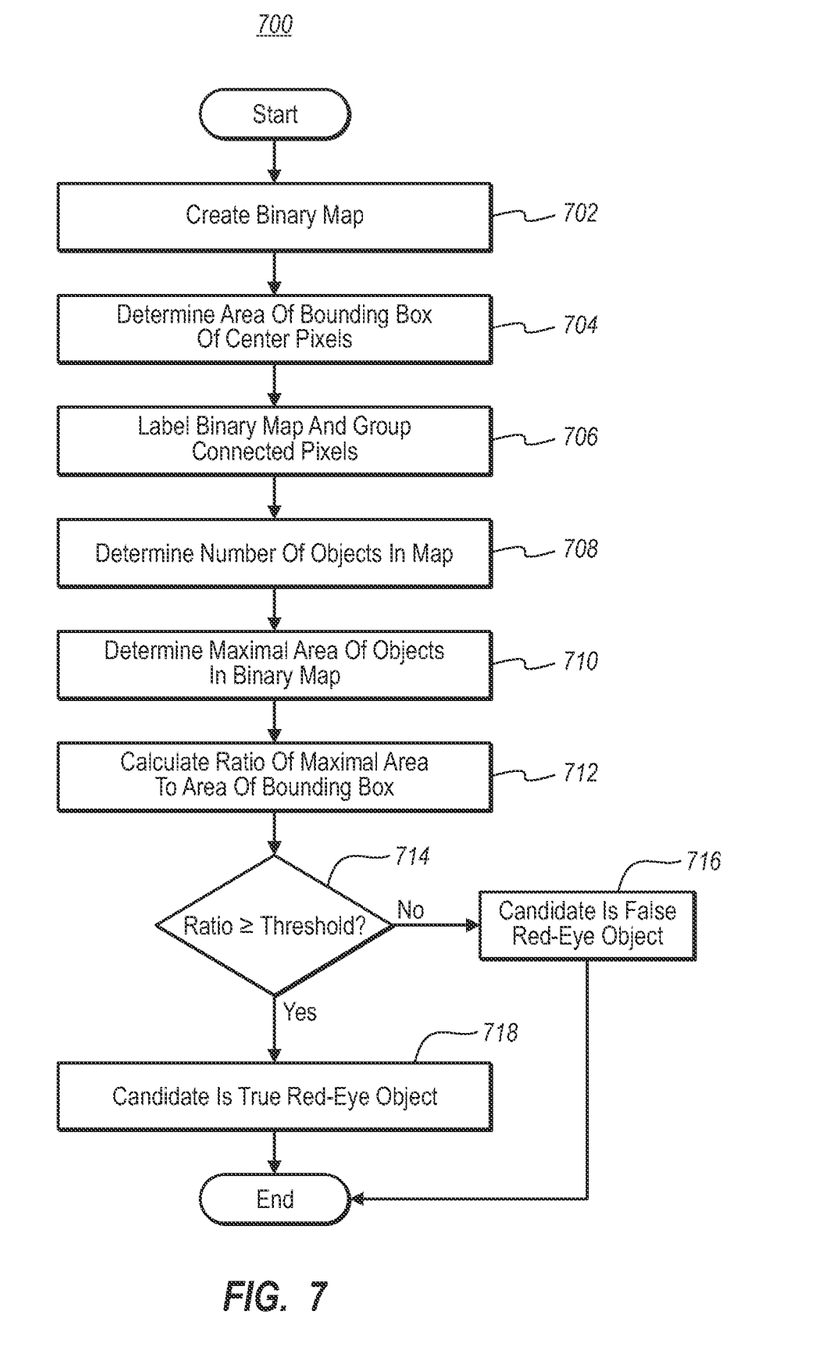
FIG. 7 is a flowchart of a fourth example red-eye object classification method.

With reference now to FIG. 7, a fourth example method 700 for classifying a candidate red-eye object in a digital photographic image is disclosed. The method 700 is based on the observation that the distribution of the subwindow centers of a true red-eye object, which can pass through AdaBoost classifier, is quite different from that of a false red-eye object. In general, for a true red-eye object, there will be multiple detects which are connected or close to each other in a local neighborhood of the exact location. This results in a compact spatial distribution of the corresponding detected centers. However, for a false red-eye object, the detection is usually unreliable, resulting in a scattered center distribution. The method 700 employs these observations, and can be implemented in the following pseudocode:

---

(1) Input: Eye candidate region $O_i$ with M center pixels ($C_i^X[j], C_i^Y[j]$), for j = 1, 2, ..., M, obtained from AdaBoost classifier (2) Set $C_i^W = \max_j(C_i^X[j]) - \min_j(C_i^X[j])$, and $C_i^H = \max_j(C_i^Y[j]) - \min_j(C_i^Y[j])$ (3) Create a binary map b of a minimum size $C_i^W \times C_i^H$ by setting 1 to center pixels
(4) Label b and obtain $N_i^C$ and $A_i^{C\,max}$ as described in [0063] and [0066]
(5) If $N_i^C > T_1^C$
    Set candidate region $O_i$ as false
    Else if ($N_i^C > T_2^C$ and $A_i^{C\,max} < T_1^A$)
    Set candidate region $O_i$ as false
    Else if ($N_i^C > T_3^C$ and $A_i^{C\,max} < T_2^A$ and $A_i^{Cmax} < T_1^R C_i^W C_i^H$)
    Set candidate region $O_i$ as false
    Else if ($A_i^{C\,max} < T_2^R C_i^W C_i^H$)

---

The various acts of the method 700 will now be discussed in turn with reference to the above pseudocode. First, at 702, a binary map is created that distinguishes between center pixels of subwindows of a given candidate red-eye object passed through an AdaBoost classifier and all other pixels of the digital photographic image. For example, to store the results of an AdaBoost rectangle center analysis, for each object $O_i$ a binary map b, with all its pixels initialized to zero, is created. In this map, the corresponding subwindow centers are indicated as $b_{(C_i^X[j], C_i^Y[j])} = 1$ where $C_i^X[j]$ and $C_i^Y[j]$ denote the coordinates of the jth subwindow center of $O_i$ which can pass through AdaBoost classifier. All other pixels $b_{(\cdot,\cdot)}$ in b are kept unchanged.

Next, at 704, an area of the bounding box of center pixels is determined. Then, at 706, the binary map created at 702 is labeled and the connected pixels are grouped to multiple objects. For example, the binary map b can be labeled in order to partition it into a number of objects. Of particular interest are $A_i^{C\,max}$ which is the area of the largest center object of $O_i$ as well as $C_i^W = \max_j(C_i^X) - \min_j(C_i^X)$ and $C_i^H = \max_j(C_i^Y) - \min_j(C_i^Y)$ which denote the range of center distribution in the horizontal and the vertical direction, respectively.

Next, at 708, the number of objects in the binary map is determined. Then, at 710, the maximal area of the objects in the binary map is determined. Next, at 712, the ratio of the maximal area and the area of the bounding box is calculated. Then, at 714, the ratio is compared to a threshold. If the ratio is less than the threshold, then, at 716, the candidate red-eye object is classified as a false red-eye object. Alternatively, if the ratio is greater than or equal to the threshold, then, at 718, the candidate red-eye object is classified as a true red-eye object.

In some example embodiments, the acts 708-718 can be implemented as follows. Since the center pixels of a true red-eye object readily constitute a cluster as opposed to noise-like center distributions for false red-eye objects, the value of $N_i^C$, which is the number of center objects of $O_i$, is small for a true red-eye object and large for a false red-eye object. Based on this observation, the following classification rule can be formulated: A candidate object $O_i$ is classified as an eye object if its corresponding $N_i^C$ value is smaller than a predetermined threshold $T_1^C$. All the remaining objects, which do not pass the above classification rule, undergo another test in order to achieve high classification accuracy. This second test evaluates $O_i$ according to its $A_i^{C\,max}$. Since a number of AdaBoost passing rectangles with different scales are usually centered in or around a true red-eye object, it is reasonably to expect that $A_i^{C\,max}$ is a large number for true red-eye objects. In addition, based on the observation that most center pixels ($b_{(\cdot,\cdot)} = 1$) are connected or close to each other for a true red-eye object, it can be decided that a candidate object is a true red-eye object if the corresponding $A_i^{C\,max}/(C_i^W \times C_i^H)$ exceeds a certain value. As shown in the above pseudocode, the two above classification rules can easily be modified and/or combined for the purpose of designing a powerful yet still simple classifier. The method 700 can achieve good results when its parameters are set as $T_1^C = 11$, $T_2^C = 6$, $T_3^C = 3$, $T_1^A = 10$, $T_2^A = 20$, $T_1^R = 0.2$, and $T_2^R = 0.1$. It has been shown from experiments that a large number of false red-eye objects can be removed with very little sacrifice in the detection rate. It should be understood that the method 700 is not limited to the embodiment shown in the above pseudocode and that a number of classifiers can be designed by following the rationale behind this embodiment.

IX. Fifth Example Method for Classifying a Candidate Red-Eye Object

Figure 8:
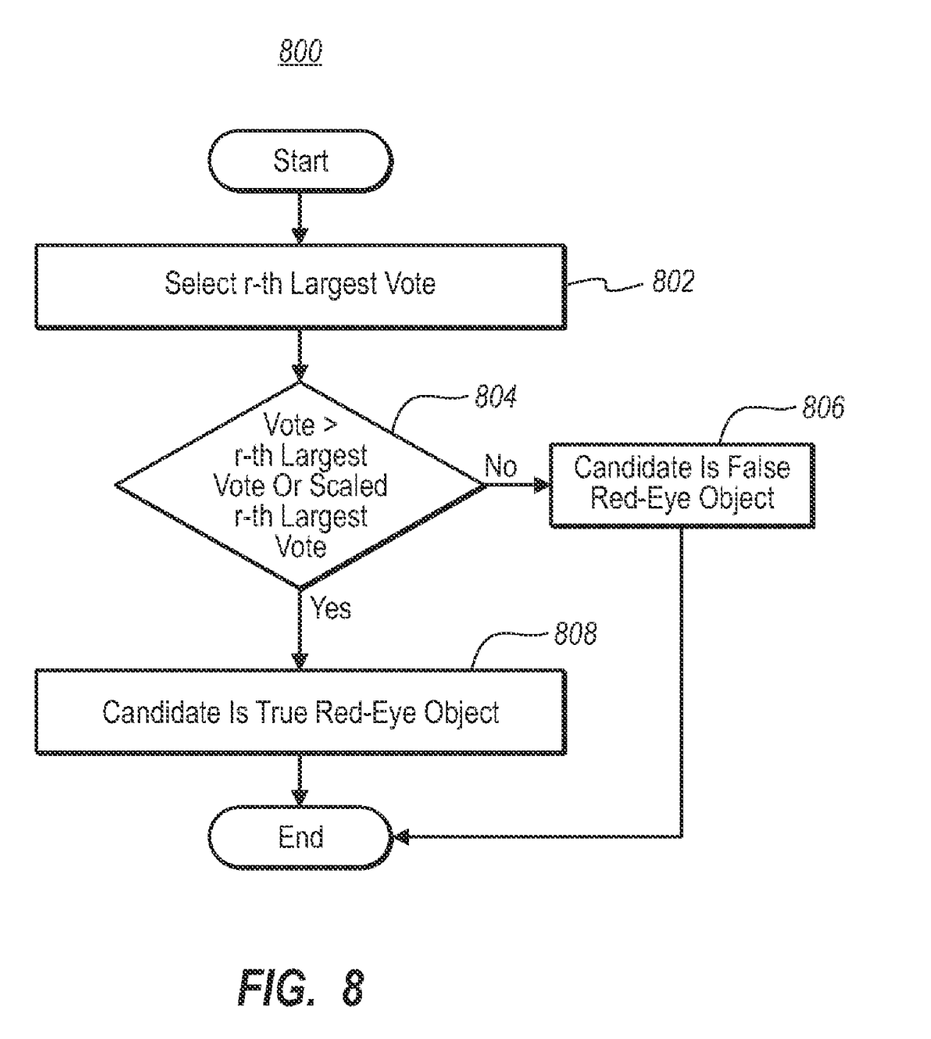
FIG. 8 is a flowchart of a fifth example red-eye object classification method.

With reference now to FIG. 8, a fifth example method 800 for classifying a candidate red-eye object in a digital photographic image is disclosed. It has been found heuristically that candidates with small votes have a high chance of being false red-eye objects. This suggests that candidates whose votes are smaller than a predetermined threshold should be removed. Unfortunately, the optimal threshold value varies for different images. For example, in portrait type images where the size of an eye region is larger, a true red-eye object usually receives a large number of votes. On the other hand, in low resolution images or images with multiple faces the size of a true red-eye object is usually smaller, thus resulting in a smaller number of votes.

In order to avoid this problem, the method 800 described below sets the threshold for each image according to the characteristics of its candidates. First, at 802, the rth largest vote between the votes of candidate objects is selected. For example, for the set of candidate objects $\{O_i; i=1, 2, \ldots, N\}$ belonging to the same input image, the rth largest vote $V^{(r)}$ in the set of corresponding votes $\{V_i; i=1, 2, \ldots, N\}$ can be used to define an object classification rule. Next, at 804, the vote of the candidate red-eye object is compared to the rth largest vote or to a scaled version of the rth largest vote. If the vote of the candidate red-eye object is less than or equal to the rth largest vote or to a scaled version of the rth largest vote, then at 806 the candidate red-eye object is classified as a false red-eye object. Otherwise, at 808, the candidate red-eye object is classified as a true red-eye object. For example, the object $O_i$ is considered as a true red-eye object if $V_i > \alpha \times V^{(r)}$, where $\alpha<1$ is a predetermined parameter indicating how much confidence (votes) a candidate red-eye object should achieve given the information of most possible red-eye objects (with the rth largest vote value) in the image. Good results and reliable performance of this proposed classifier are achievable for $r=2$ and $\alpha=0.2$.

X. Sixth Example Method for Classifying a Candidate Red-Eye Object

Figure 9:
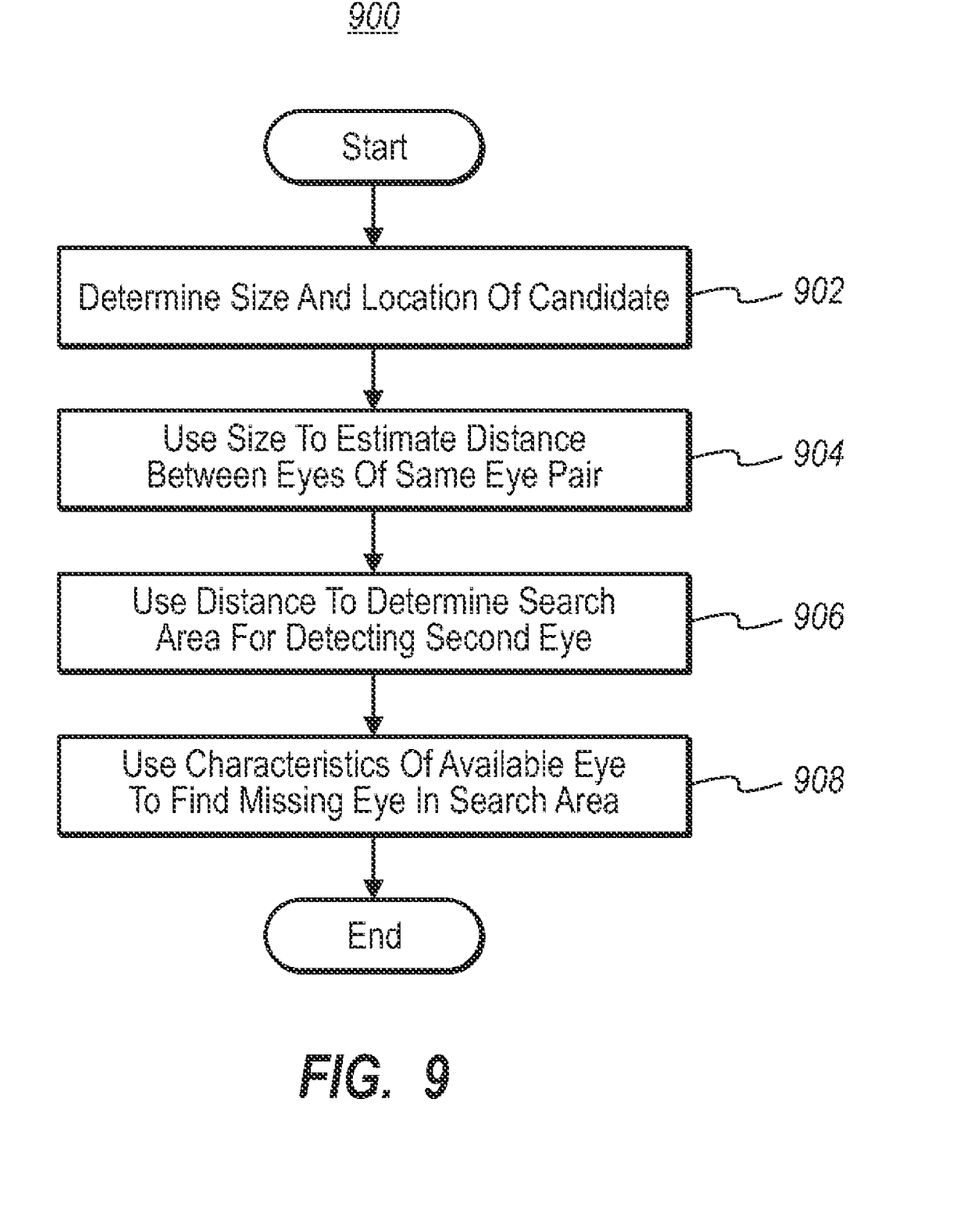
FIG. 9 is a flowchart of a sixth example red-eye object classification method.

With reference now to FIG. 9, a sixth example method 900 for classifying a candidate red-eye object in a digital photographic image is disclosed. In order to improve the classification result and increase the detection performance, the missing eye can be recovered based on the characteristics of its detected neighbor from the same eye pair. Such characteristics may include, but are not limited to, an eye size, shape and color.

For example, given the face size and the distance between the two eyes of a typical human face, the second eye can be recovered based on the size of a pupil or an eye ball of the detected first eye. The example method 900 is based on this principle.

First, at 902, the size and location of an eye passed through the detection/classification pipeline is determined. For example, the detected first eye can be seen as an object $O_i$ characterized by the bounding box $\Phi_i^y \times \Phi_i^x$ with height $\Phi_i^y$, width $\Phi_i^x$, and center $C_i = (Y_i, X_i)$.

Next, at 904, the size information can be used to estimate the distance between the eyes of the same eye pair. Then at 906, this distance is used to determine the search area for detecting the second eye from the same eye pair. Finally, at 908, the characteristics of the available eye are used to find a missing eye in the search area. For example, any object $O_j$, for $j \neq i$, available in early stages of a detection/classification pipeline or object having similar size, shape and/or color characteristics as the detected eye should satisfy the following distance constraint in order to be considered as a missing eye candidate:

$$\delta_1 f(\Phi_i^y, \Phi_i^x) < d(C_i, C_j) < \delta_2 f(\Phi_i^y, \Phi_i^x) \quad (3)$$

where $d(C_i, C_j)$ denotes the distance between the centers of $O_i$ and $O_j$ whereas $f(\Phi_i^y, \Phi_i^x)$ is the function of the detected eye dimensions. One possible solution is to define $d(.,.)$ as the Euclidean distance, although other definitions such as the absolute distance, city-block distance, Minkowski metrics, or various similarity measures can be used instead. The term $f(.,.)$ can be defined as an average or maximum of $\Phi_i^y$ and $\Phi_i^x$, although other definitions are also possible. As can be seen in Equation (3), the $d(C_i, C_j)$ value is bounded from both sides using the $f(\Phi_i^y, \Phi_i^x)$ value multiplied by parameters $\delta_1$ and $\delta_2$. Namely, $\delta_1 f(\Phi_i^y, \Phi_i^x)$ and $\delta_2 f(\Phi_i^y, \Phi_i^x)$ determine the minimum and the maximum value, respectively, for which $d(C_i, C_j)$ still satisfies the constraint of the distance between the two eyes of a common human face. If more than one object satisfies this constraint, which is a quite rare but not a completely impossible situation, then the missing eye can be selected from the candidates satisfying Equation (3) as the one which exhibits the highest similarity in size, shape, and/or color with respect to $O_i$. In red-eye applications, based on the size of the red portion of $O_i$, good performance of Equation (3) can be achieved using $\delta_1=4.75$, $\delta_2=8.5$, and $d(.,.)$ calculated as the Euclidean distance.

The example embodiments disclosed herein may be embodied in other specific forms. The example embodiments disclosed herein are to be considered in all respects only as illustrative and not restrictive.

What is claimed is:

1. A method for classifying a candidate red-eye object in a digital image, the method comprising the acts of:
    i) selecting a candidate red-eye object in a digital image;
    ii) determining the number of subwindows of the selected candidate red-eye object passed through an AdaBoost classifier for a certain classification stage;
    iii) calculating a ratio between either:
    iii.a) the number of subwindows passed through a current stage and the number of subwindows passed through a previous stage; or
    iii.b) the number of subwindows passed through the current stage and the difference between the total number of subwindows to be tested by the AdaBoost classifier and the number of subwindows passed through the previous stage;
    iv) determining that the ratio is greater than or equal to a stage threshold; and
    v) transforming the candidate red-eye object into a true red-eye object.

2. The method as recited in claim 1, wherein the acts iii.a), iv) and v) are performed according to the following equation:

$$S_i = \begin{cases} 1 & \text{if } V_i^\alpha / V_i^{(\alpha-1)} \geq \eta_\alpha; \alpha = 1, 2, \ldots, \lambda' \\ 0 & \text{otherwise} \end{cases}$$

where:
   $S_i=1$ denotes that the candidate red-eye object is a true red-eye object;
   $S_i=0$ denotes that the candidate red-eye object is a false red-eye object;
   $\eta_\alpha$ is a predetermined parameter;
   $\lambda'$ denotes the number of stages for which the classification is performed; and
   $V_i^+$ is the number of subwindows passed the $\alpha$th stage of AdaBoost.

3. The method as recited in claim 1, wherein the acts iii.b), iv) and v) are performed according to the following equation:

$$S_i = \begin{cases} 1 & \text{if } V_i^1/V_i^T \geq \eta_1 \\ 1 & \text{if } V_i^\alpha/(V_i^T - V_i^{(\alpha-1)}) \geq \eta_\alpha; \alpha = 2, 3, \ldots, \lambda' \\ 0 & \text{otherwise} \end{cases}$$

where:

$S_i=1$ denotes that the candidate red-eye object is a true red-eye object;

$S_i=0$ denotes that the candidate red-eye object is a false red-eye object;

$\eta_\alpha$, for $\alpha=1, 2, 3, \ldots, \lambda'$, is a predetermined parameter;

$\lambda'$ denotes the number of stages for which the classification is performed;

$V_i^T$ is the total number of subwindows to classify; and $V_i^\alpha$ is the number of subwindows that passed the $\alpha$th stage of AdaBoost.

4. The method as recited in claim 1, further comprising the act of:

viii) transforming the true red-eye object into a corrected eye object by removing the red-eye effect from the true red-eye object.

5. One or more non-transitory computer-readable media having computer-readable instructions thereon which, when executed by a processor, implement a method for classifying a candidate red-eye object in a digital image, the method comprising the acts of:

i) selecting a candidate red-eye object in a digital image;

ii) determining the number of subwindows of the selected candidate red-eye object passed through an AdaBoost classifier for a certain classification stage;

iii) calculating a ratio between either:

iii.a) the number of subwindows passed through a current stage and the number of subwindows passed through a previous stage; or iii.b) the number of subwindows passed through the current stage and the difference between the total number of subwindows to be tested by the AdaBoost classifier and the subwindows passed through the previous stage;

iv) determining that the ratio is greater than or equal to a stage threshold; and v) transforming the candidate red-eye object into a true red-eye object.

6. An image processing apparatus comprising:

an electronic display; and a processor in electronic communication with the electronic display; and the one or more computer-readable media as recited in claim 5.

7. The image processing apparatus as recited in claim 6, wherein:

the image processing apparatus comprises a printer;

the one or more computer-readable media comprises one or more of a RAM, a ROM, and a flash EEPROM; and the electronic visual display comprises a liquid crystal display.

* * * * *

UNITED STATES PATENT AND TRADEMARK OFFICE
CERTIFICATE OF CORRECTION

| | |
|---|---|
| PATENT NO. | : 8,170,332 B2 |
| APPLICATION NO. | : 12/575298 |
| DATED | : May 1, 2012 |
| INVENTOR(S) | : Jie Wang et al. |

It is certified that error appears in the above-identified patent and that said Letters Patent is hereby corrected as shown below:

Column 14,
Line 66, please change "$V_i^+$ is the number of subwindows passed the $\alpha$ th stage of AdaBoost."
to -- $V_i^\alpha$ is the number of subwindows passed the $\alpha$ th stage of AdaBoost.--

Signed and Sealed this
Third Day of July, 2012

David J. Kappos
*Director of the United States Patent and Trademark Office*